United States Patent

[11] 3,620,271

| [72] | Inventor | Lavern L. Loyer |
| | | 24898 Champaigne, Taylor, Mich. 48180 |
| [21] | Appl. No. | 9,567 |
| [22] | Filed | Feb. 9, 1970 |
| [45] | Patented | Nov. 16, 1971 |

[54] METHOD OF AND APPARATUS FOR REMOVING STUMPS
10 Claims, 10 Drawing Figs.

[52] U.S. Cl. ..................................................... 144/2 N, 144/309
[51] Int. Cl. ....................................................... A01g 23/06
[50] Field of Search ............................................. 144/2–11, 193 (2), 193 (1), 193, 309

[56] References Cited
UNITED STATES PATENTS

| 1,663,277 | 3/1928 | Murry ........................... | 144/193 B |
| 2,966,180 | 12/1960 | Bles .............................. | 144/2 N |
| 3,461,927 | 8/1969 | Funari ........................... | 144/2 N |

*Primary Examiner*—Donald R. Schran
*Attorney*—Burton and Parker

ABSTRACT: This disclosure relates to apparatus for removing tree stumps from the ground quickly and in such condition that the removed stump may thereafter be burned expeditiously as part of a land-cleaning operation. A vertically arranged blade sharpened along its bottom and forward edges and having a relatively flat face along its rear edge is mounted on a tractor in such fashion that the weight of the tractor may be utilized to force the sharpened lower edge down through the stump to split it; forward movement of the tractor will draw the sharpened forward edge of the blade through the stump to further split it; and rearward movement of the tractor combined with upward movement of the blade will pull rendered portions of the stump from the ground in a substantially dirt free condition.

INVENTOR
LAVERN L. LOYER
BY
Burton & Parker
ATTORNEYS

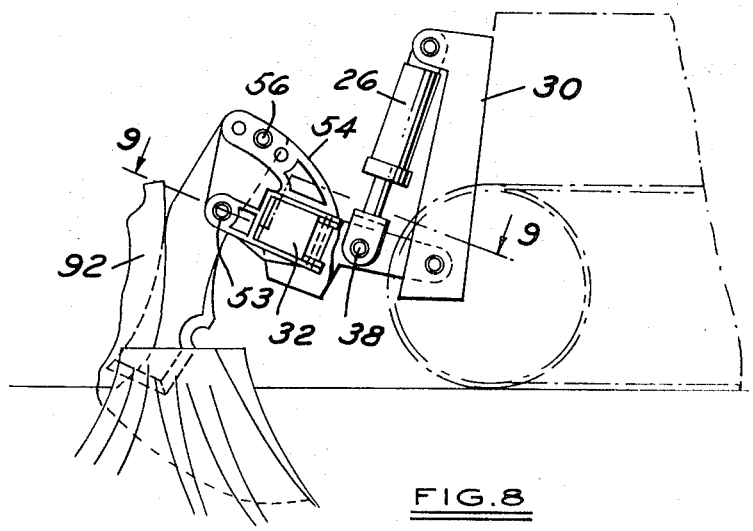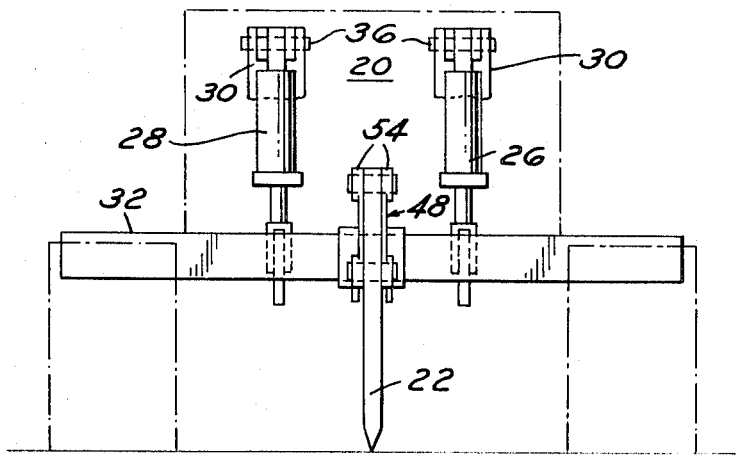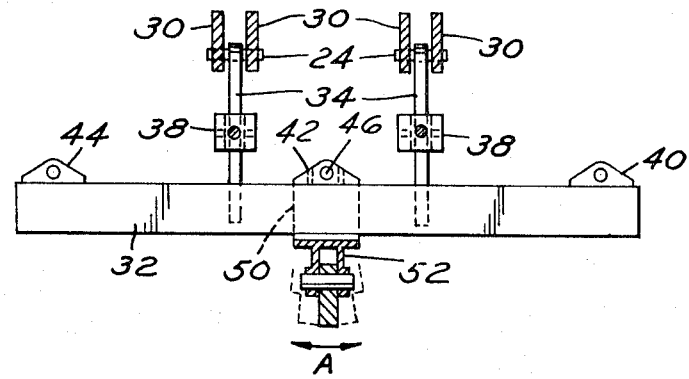

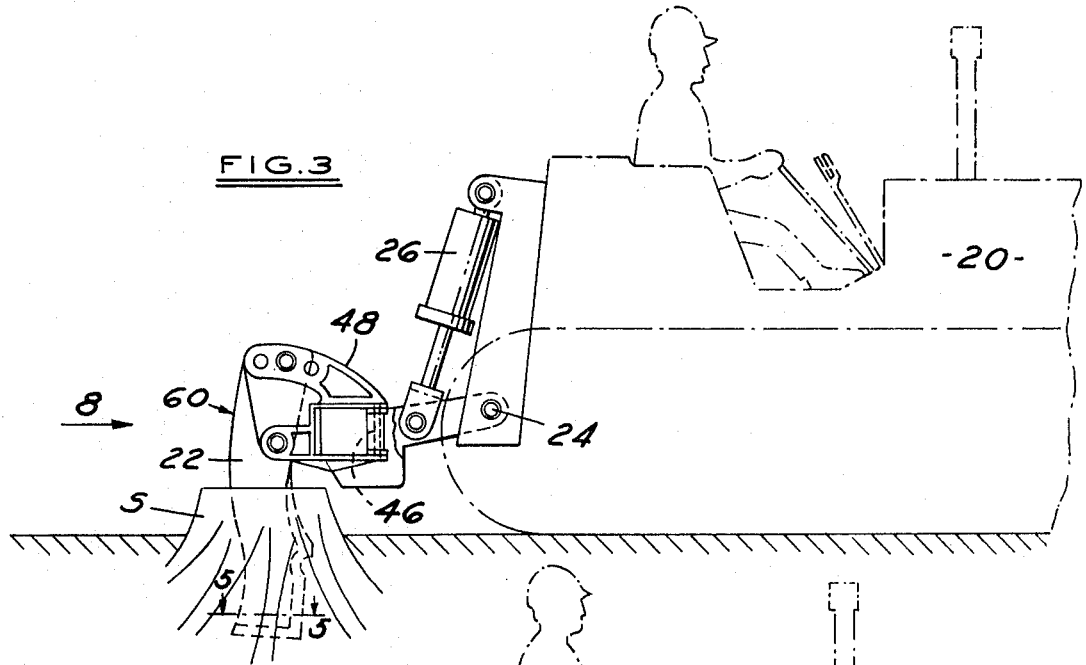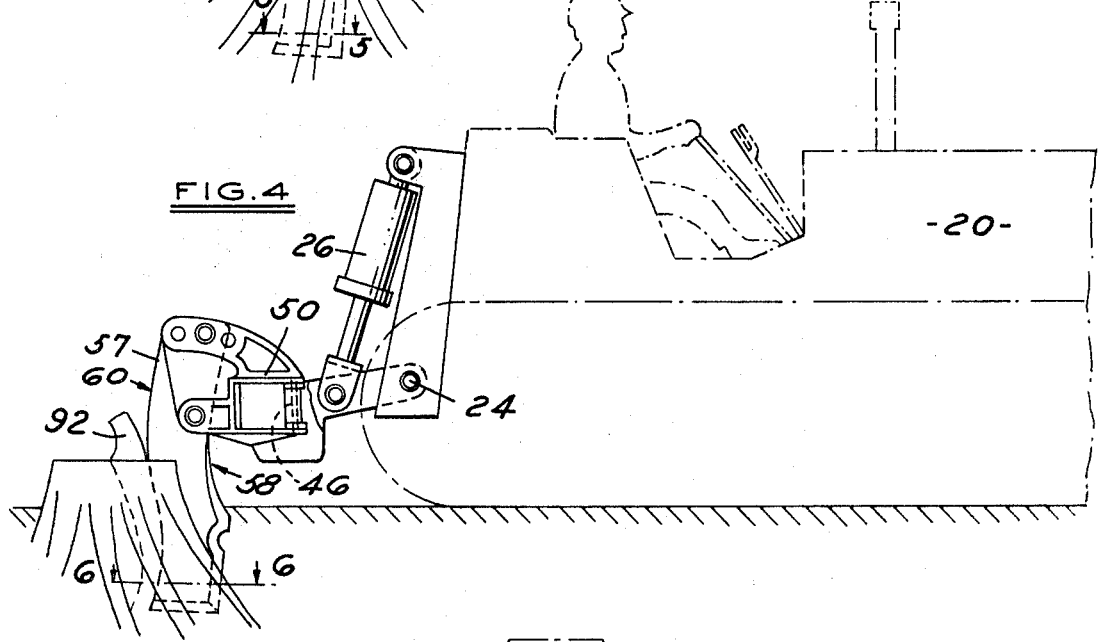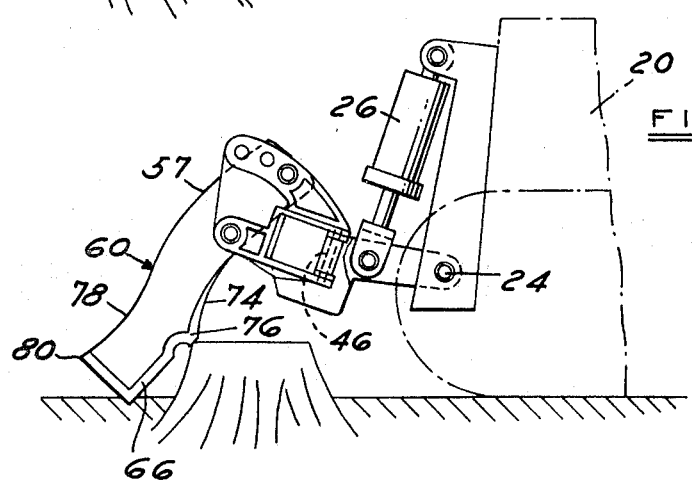

3,620,271

METHOD OF AND APPARATUS FOR REMOVING STUMPS

BACKGROUND OF THE INVENTION

1. Field of the Invention

This invention relates to apparatus for removing tree stumps.

2. Description of Prior Art

For a number of years there have been efforts by others to devise apparatus for removing stumps efficiently. The following U.S. patents are representative of such efforts. U.S. Pat. Nos. 1,330,687, 2,934,109, 1,663,277, 2,966,180, 2,157,483, 3,126,927, and 3,461,927.

SUMMARY OF THE INVENTION

The ability of apparatus to remove a stump is not today the sole nor the principal criteria of a satisfactory stump remover. As much of the land clearing today is to prepare for new subdivisions contiguous to existing residential areas and often occurs within the limits of municipalities, the burning of removed stumps cannot be carried on without regard to the polluting effect of the smoking stumps. While equipment for burning stumps with a minimum of air pollution has been devised, unless the stumps are substantially free of clinging earth, the burning cannot be accomplished either quickly or without smoking. Therefore it is desirable to be able to remove stumps free of any substantial clinging earth.

In addition, when stumps are removed with substantial amounts of earth, the resulting hole requires filling and increases land clearing costs.

Of considerable importance is speed of stump removal and cost and complexity of the removal equipment. If one piece of equipment will remove a stump in 5 minutes and another in 8 minutes, the former is much to be preferred provided equipment costs are comparable, and where the first piece of equipment is even less costly than the latter, it is certainly to be preferred.

I have discovered that if instead of attempting to pull the stump from the ground, the stump is split or shredded while in the ground and then the split and shredded portions are pulled out, the pieces may be removed substantially dirt-free ready for efficient burning. In addition, while the stump is in the ground it is held as in a vise and therefore there can be split and shredded without the handling equipment that would be required if such operations were carried out after its removal.

U.S. Pat. Nos. 2,966,180, 2,934,109 and 3,126,927 show blades having cutting edges for cutting into a stump while it is in the ground, but the action of the apparatus tends to pull the stump out of the ground while trying to split it rather than split it up prior to its removal. Also, the action of such blades would tend to cut the stump horizontally rather than vertically so that cut pieces removed from the ground would tend to carry the earth clinging thereto with them. Further the apparatus on which the blades of these patents is mounted is subjected to substantial stresses and requires application of considerable power by the engines.

My invention overcomes the foregoing and other drawbacks of the prior art stump removers and comprises a novel blade which splits the stumps vertically from top to bottom utilizing the weight of the apparatus on which the blade is mounted. The blade is so shaped and sharpened that it will split the stump during downward and forward motion and will pull split pieces of the stump from the ground upon rearward and upward motion. In comparison with the prior art stump removers, my blade is less costly. I have found that using my blade, a stump 2 feet in diameter may be split and removed from the ground substantially dirt-free in approximately 3 minutes. Stumps which have already been removed from the ground may be split up using my novel blade thereby removing upwards of 80 percent of the dirt clinging to them. To split stumps in an area that has been burned over and where the stumps are, as a consequence, very hard, my improved blade is provided with a sawing surface along a portion of its front edge so that the blade may be more readily started into the stumps.

FIG. 3 shows the blade buried in the stump after the initial split and prior to lateral forward movement of the blade;

FIGS. 4 and 7 show the blade being moved rearwardly and upwardly through the stump to remove a rendered portion thereof;

FIG. 4 is a cross-sectional view on the line 5—5 of FIG. 3;

FIG. 8 is a rear view of the blade mounting means on the tractor looking in the direction of arrow 8 in FIG. 3 but with the stump omitted for clarity;

FIG. 9 is a top view partly in section taken on the line 9—9 of FIG. 7; and

FIG. 10 illustrates the method of splitting an unusually hard stump.

Figure 1:
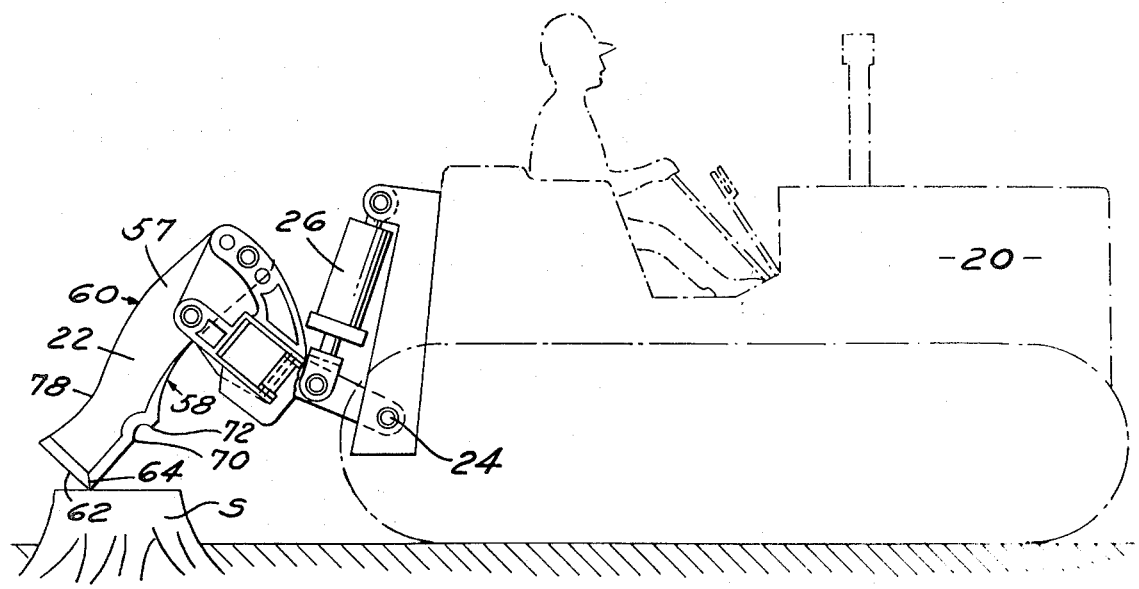
FIG. 1 is a side view of a tractor with my improved blade mounted thereon and in position to commence removal of a stump.

The apparatus for removing stumps in a substantially dirt-free condition as contemplated by my invention includes a conventional tractor 20 having my improved blade 22 mounted thereon for swingable movement in a vertical plane about the horizontal axis 24 under the influence of hydraulic cylinders 26 and 28 carried by a portion 30 of the frame of the tractor. While other size tractors may also be suitable, I have found that a 250 horsepower crawler-type tractor weighing upwardly of 30 tons is quite satisfactory. Such tractors are available from various tractor manufacturers, one such being the model D8H manufactured by the Caterpillar Tractor Company. In the case of the model D8H the means for mounting the blade is commercially available from the manufacturer and is normally used for mounting other tools. It comprises a transverse beam 32 of box-shaped cross section carried for vertical swinging motion by a pair of arms 34 rigidly secured to the member 32 at their outer ends and pivotally connected at their inner ends as at 24 to the frame portion 30 of the tractor. The upper ends of the hydraulic cylinders 26 and 28 are pivotally connected as at 36 to the frame portion 30 with the piston rods of the cylinders connected at their lower ends as at 38 to the arms 34.

On the forward side of the beam 32 are three laterally spaced pairs of vertically spaced flanges generally indicated at 40, 42 and 44 with each pair provided with aligned apertures for vertical reception of a pin 46 (FIGS. 3 and 4). A tool mounting bracket 48 having a U-shaped beam embracing portion 50 is removably locked on the beam midway between its ends for limited pivotal movement in the direction of arrow A in FIG. 9 by the pin 46 passing through the U-shaped portion 50 and the flanges 42. The bracket has a rearwardly extending bifurcated portion 52 having aligned apertures of reception of a blade locking pin 53 and an upwardly and rearwardly extending bifurcated portion 54, having three sets of aligned apertures for reception of a blade locking pin 56.

Figure 2:
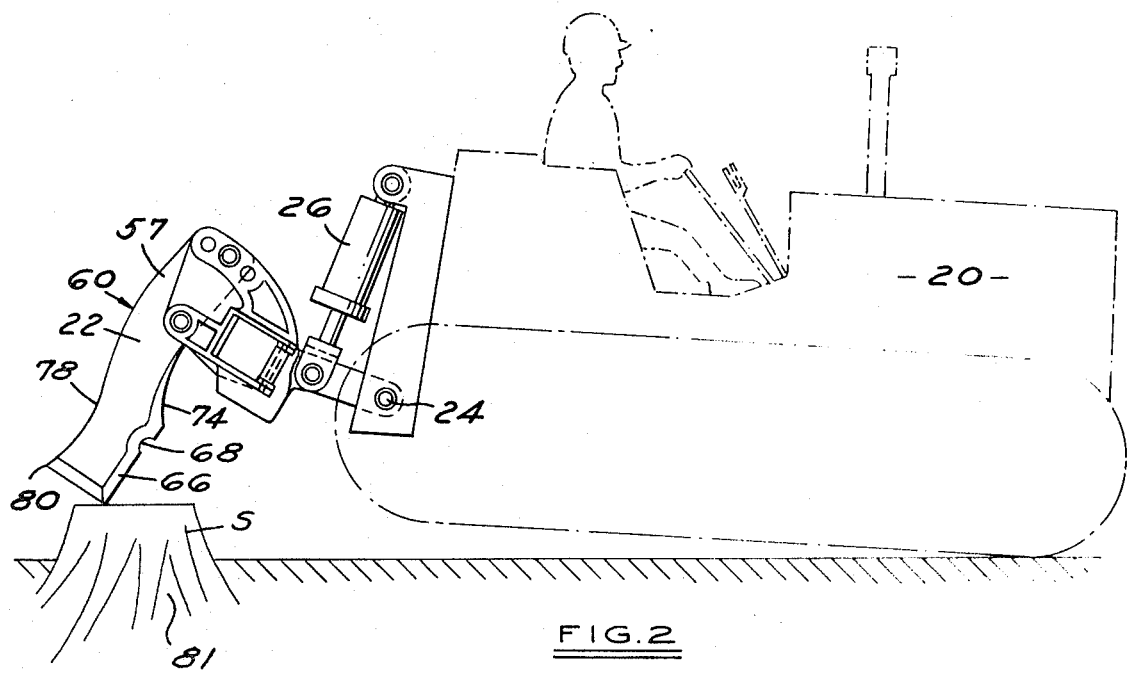
FIG. 2 is similar to FIG. 1 except that the removal operation has commenced and the weight of the tractor is shown being utilized to start the initial split of the stump.

My improved blade 22 is a flat elongated steel member having a profile shape best shown in FIGS. 1 and 2. The blade has an upper mounting portion 57 which includes means for mounting the blade on the tractor comprising a pair of longitudinally spaced apertures alignable with the apertures in the bifurcated portions 52 and 54 of the bracket 48 for reception of the pins 53 and 56. The blade has longitudinally extending front and rear edges 58 and 60 meeting the lower end edge 62. The lower edge 62 is sharpened like a chisel. The forward edge 58 is also sharpened from just below the upper mounting portion of the blade down to the lower edge 62 with the front and lower edges meeting at a sharpened front lower corner 64. The front edge of the blade has a sharpened portion 66 extending along the blade from the lower edge 62, or the corner 64, substantially parallel to the longitudinal dimension of the blade. In the illustrated embodiment the sharpened portion is interrupted at 68 by a notchlike recess which forms a pair of sharp corners at 70 and 72, the purpose of which is hereinafter described. Above the sharpened portion 66 the front cutting edge sweeps inwardly or rearwardly as at 74 (see FIG. 2) to provide a concave cutting portion or profile for the front edge which merges into the upper mounting portion 57. Between this concave portion 74 and the notch 68, the cutting portion 66 exhibits a tooth 76 as best shown in FIG. 10. A sharpened corner 78 is provided where this tooth meets the curvature 74.

The rear edge 62 of the blade is a noncutting broad or flat surface disposed perpendicular to the plane of the blade. Below the upper mounting portion 57 of the blade this rear edge is shaped in concave or hooklike profile 78 terminating at its lower end in a point 80 at the lower cutting edge 62.

The longitudinal dimension of the blade should be substantially equal to the depth of the heart portion 81 of the stump S, or in other words be able to penetrate vertically completely down through the solid wood portion of the stump as in FIG. 3. I have found that a blade having a width from the front edge to the rear edge approximately one-fourth the longitudinal dimension is satisfactory. With a blade approximately 6 feet long in its longitudinal dimension a thickness of from 2½ to 3 inches is satisfactory.

The blade may be either case hardened to prolong the life of the sharpened edges, or the edges themselves may be made of removable hardened steel inserts in any fashion appealing to the routineer.

According to the method of removing stumps following the teaching of my invention, the stump is first split vertically from top to bottom in a plurality of transversely spaced locations by forcing the point 64 and lower edge 62 of the blade down through the stump from top to bottom in one stroke at each transverse location and driving the tractor forward to pull the sharpened front edge of the blade laterally through the stump, following one or more of such downward splitting motions of the blade. After making a number of such vertical splits in the stump the blade is forced backward and upward through the split stump which tears the split pieces 92 up out of the stump in substantially a dirt-free condition. This backward and upward motion of the blade is performed a number of times until the entire stump is removed.

In carrying out the method the operator positions the tractor 20 as shown in FIG. 1 with the blade 22 raised and with its lower forward corner disposed on the center of the stump. Then the operator pressurizes the cylinders 26 and 28 to force the blade down through the stump to the position shown in FIG. 3. During the splitting the weight of the tractor is relied upon to provide the mass to offset the resistance of the blade to penetrating the stump and in some instances the tractor will tend to lift off the ground as shown in FIG. 2, and then settle back down as the blade passes completely down through the stump. In any event the horsepower required to force the blade down through the stump is relatively small and tractor is subjected to little strain, as compared with the three prior art patents heretofore specifically mentioned.

With the blade in the position of FIG. 3, the operator then moves the tractor forward drawing the blade laterally through the side of the stump splitting it across. The foregoing sequence is repeated a few times, the number depending on the diameter of the stump, each split being spaced from the others, or in some instances the tractor is moved around to another side of the stump, say at 90° to the first few splits, and the sequence repeated until the stump is fairly well rendered. Thereupon, starting with the blade in its downward position, and with the rear edge 60 facing the stump the operator backs the tractor toward the stump to engage the rear edge of the blade with the rendered pieces and while continuing such backing swings the blade upwardly in the sequence represented by FIGS. 4 and 7 to tear rendered pieces of the stump therefrom. This operation is repeated until all the stump is removed. The method thus described will completely remove the stump, or at least all the major sections thereof which would interfere with subsequent grading and basement excavation, and the removed pieces are substantially dirt free.

In the event the blade should encounter large stones or the like inhibiting its movement, the pivotal action afforded by the pin connection at 48 (see FIGS. 4 and 8) will allow the blade to deflect slightly and prevent its damage. In addition, this pivotal mounting of the blade will allow it to tend to twist slightly as it is moved backward through the stump facilitating the removal of the stump pieces.

Figure 5:
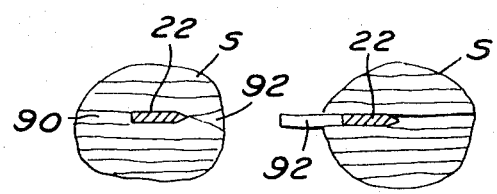
Figure 6:
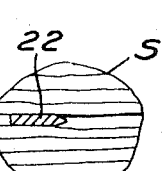
FIG. 6 is a cross-sectional view on the line 6—6 of FIG. 4.

In FIG. 5 he blade is shown in cross section embedded in the stump S, showing the split 90 behind the blade as a result of the downward sweeping motion from FIG. 1 to FIG. 3 and the stump area 92 to be split as the tractor is driven forwardly. It will be noted that all the cutting or splitting action of the blade is either downward or parallel to the vertical axis of the stump, rather than transverse or horizontal as with the methods typified by U.S. Pat. No. 2,934,108. In FIG. 6 the blade 22 is moving rearwardly as in FIG. 4 pushing a rendered section 92 of the stump ahead of it. The lower rear corner 80 of the blade will in some instances impale a rendered piece of the stump and force the piece out of the stump as the blade is swung upwardly and in other instances the concave profile 78 of the rear edge will cam, as it were, the rendered sections out of the stump as the blade moves upwardly and rearwardly.

Where particularly hard surface stumps are encountered as where the area being cleared has been burned over, the initial splits in the stump are facilitated by notch 68, tooth 76 and concave profile edge 74. The tractor is positioned as in FIG. 10 and the blade swung down and up in a rocking motion as the tractor is moved slightly ahead. This action causes the points 70, 72, the tooth 76 and the concave cutting edge 74 to be drawn in a modified sawing motion across the edge of the stump so that the blade penetrates the softer center. With such penetration the blade is then swung fully down and the tractor moved ahead to draw the blade through the stump.

What is claimed is:

1. The method of removing stumps substantially dirt-free from the ground comprising the steps of:

splitting the stump vertically at a plurality of transverse locations from top to bottom by forcing the sharpened lower edge of a blade vertically down through the stump from the top to the bottom in a single pass at each location, further splitting the stump vertically from top to bottom of each of the aforesaid transverse locations by drawing a sharpened vertical edge of the blade horizontally through the stump, pushing split pieces of the stump upwardly out of the stump and earth by engaging a flat hook-shaped vertical noncutting edge of the blade with the split pieces and moving the blade horizontally and simultaneously swinging it upwardly in directions opposite to the splitting motions.

2. The invention defined by claim 1 further characterized by initiating a vertical split in the stump by moving said sharpened vertical edge of the blade back-and-forth at an acute angle to the top of the stump against an upper corner of the stump while simultaneously urging such edge of the blade into the stump and said sharpened lower edge down through the stump.

3. The method of removing stumps substantially dirt-free from the ground comprising the steps of:

mounting in a vertical position on a tractor or the like a flat elongated blade sharpened along its lower edge and one vertical edge for swingable motion in its own plane between a vertical first position and an angled second position in which the vertical sharpened edge is at an acute angle with the ground, moving the tractor to a position to dispose the blade in said second position above the stump, swinging the blade to the first position downwardly through the stump to split it vertically and moving the tractor to shift the blade horizontally to force the vertical cutting edge through and out of the stump, repeating the last two steps to form a plurality of vertical splits in the stump, and with the blade in the first position moving the tractor in a direction while swinging the blade to the second position to being another noncutting vertical edge of the blade into contact with split pieces of the stump near the bottom of the stump to push such pieces upwardly out of the ground.

4. Stump-removing apparatus comprising, in combination: a self-propelled land vehicle, an elongated flat blade mounted at one end for swingable movement in its own plane on the vehicle between a first position extending vertically down into the ground a distance substantially equal to the depth of stumps to be removed and a second position swung upwardly out of the ground with its lower edge disposed above the upper end of the stumps to be removed, means mounting said blade for such movement and for imposing the weight of the tractor on the blade during movement from the second to the first position, said blade having a sharpened downwardly facing lower edge and a sharpened vertically extending front edge meeting said lower edge at a sharpened corner and extending upwardly a distance equal to at least the depth of the stumps to be removed and a flat vertically extending hook shaped rear edge extending upwardly from the sharpened downwardly facing lower edge.

5. The invention defined in claim 4, characterized in that said blade is mounted on the tractor with its plane extending substantially parallel to the longitudinal centerline of the tractor.

6. The invention defined in claim 4 characterized in that the blade is also mounted for swingable movement on the tractor about a vertical axis lying the plane of the blade but offset forwardly of said sharpened front edge of the blade.

7. A stump-splitting and removing blade for mounting on a self-propelled land vehicle comprising: an elongated flat blade having a portion at one end for mounting the blade in a downwardly extending position on the vehicle, said blade having opposite longitudinally extending front and rear edges connected at the end opposite said portion by a lower edge, said front and lower edges being sharpened and meeting at a sharpened lower front corner of the blade, said sharpened front edge extending upwardly along the blade from the lower edge, said sharpened edges lying in the plane of the flat blade, and said rear edge being a broad pushing surface disposed perpendicular to the plane of the blade and extending upwardly along the blade from its point of intersection with the lower edge in a concave profile.

8. The invention defined by claim 7 characterized in that said sharpened front edge extends upwardly from said lower cutting edge in a direction substantially parallel to the longitudinal dimension of the blade.

9. The invention defined by claim 7 characterized in that said lower cutting edge and said front cutting edge are disposed substantially perpendicular to each other.

10. The invention defined by claim 7 characterized in that said front cutting edge includes a toothlike cutting portion.

* * * * *